US011937544B2

(12) United States Patent
Ro

(10) Patent No.: US 11,937,544 B2
(45) Date of Patent: Mar. 26, 2024

(54) ELECTRIC MOWER SWITCH SYSTEM

(71) Applicant: Honda Motor Co., Ltd., Tokyo (JP)

(72) Inventor: Kyusang Ro, Chapel Hill, NC (US)

(73) Assignee: Honda Motor Co., Ltd., Tokyo (JP)

( * ) Notice: Subject to any disclaimer, the term of this patent is extended or adjusted under 35 U.S.C. 154(b) by 580 days.

(21) Appl. No.: 17/189,498

(22) Filed: Mar. 2, 2021

(65) Prior Publication Data

US 2022/0279714 A1 Sep. 8, 2022

(51) Int. Cl.
| A01D 34/78 | (2006.01) |
| A01D 34/68 | (2006.01) |
| A01D 34/82 | (2006.01) |
| H02K 11/00 | (2016.01) |
| H02K 11/28 | (2016.01) |
| A01D 101/00 | (2006.01) |

(52) U.S. Cl.
CPC ......... *A01D 34/78* (2013.01); *A01D 34/6806* (2013.01); *A01D 34/824* (2013.01); *H02K 11/0094* (2013.01); *H02K 11/28* (2016.01); *A01D 2101/00* (2013.01)

(58) Field of Classification Search
CPC .. A01D 34/78; A01D 34/6806; A01D 34/824; A01D 2101/00; A01D 34/828; H02K 11/0094; H02K 11/28; H02K 2213/06
See application file for complete search history.

(56) References Cited

U.S. PATENT DOCUMENTS

| 2,815,633 | A | * | 12/1957 | Meyer | ................. A01D 34/008 56/11.8 |
| 3,855,763 | A | * | 12/1974 | Seifert | ................ A01D 34/63 56/DIG. 18 |
| 3,969,875 | A |   | 7/1976 | Nofel | |
| 5,261,215 | A | * | 11/1993 | Hartz | ................... A01D 34/824 56/DIG. 18 |
| 5,606,851 | A |   | 3/1997 | Bruener et al. | |
| 6,658,829 | B2 |  | 12/2003 | Kobayashi et al. | |
| 7,076,830 | B2 |  | 7/2006 | Conner et al. | |

(Continued)

FOREIGN PATENT DOCUMENTS

| CN | 102523817 A | * | 7/2012 | ........... A01D 34/824 |
| CN | 106385982 B |   | 4/2019 | |

(Continued)

*Primary Examiner* — Arpad Fabian-Kovacs
(74) *Attorney, Agent, or Firm* — Gregory J Burke; American Honda Motor Co., Inc.

(57) ABSTRACT

An electric lawn mower includes an electric motor and battery supported on a wheeled motor deck, a handle mounted on the deck and pivotable between first and second handle positions, and a pivoting failsafe switch system for respectively enabling and disabling powered operation of the electric motor when the handle is in the first and second handle positions. The pivoting switch assembly includes a magnet and a magnet sensor sensing the magnet. The magnet is carried by a turning member that moves when the handle is moved. The magnet sensor respectively generates high and low signals when the handle is located in the first and second handle positions. The sensor signals are transmitted to a motor control unit for respectively enabling and disabling the operation of the electric motor.

17 Claims, 5 Drawing Sheets

(56) References Cited

U.S. PATENT DOCUMENTS

| | | | |
|---|---|---|---|
| 9,462,747 B2 * | 10/2016 | Schmalz | F02B 63/02 |
| 9,648,805 B2 | 5/2017 | Nie et al. | |
| 9,730,382 B2 | 8/2017 | Proudlock | |
| 9,955,627 B2 | 5/2018 | Nakano et al. | |
| 10,729,066 B2 | 8/2020 | Yan et al. | |
| 2005/0188664 A1 * | 9/2005 | Clarke | A01D 34/824 56/14.7 |
| 2013/0111866 A1 * | 5/2013 | Schmalz | A01D 34/68 123/196 R |
| 2016/0309653 A1 * | 10/2016 | Morabit | A01D 34/416 |
| 2020/0060091 A1 * | 2/2020 | Yamaoka | A01D 34/67 |
| 2020/0245555 A1 | 8/2020 | Colber et al. | |
| 2020/0390031 A1 | 12/2020 | Yang et al. | |
| 2022/0408640 A1 * | 12/2022 | Hiller | A01D 34/68 |
| 2023/0048445 A1 * | 2/2023 | Ertl | A01D 34/006 |

FOREIGN PATENT DOCUMENTS

| | | | | |
|---|---|---|---|---|
| CN | 110313296 A | | 10/2019 | |
| DE | 2617460 A1 | | 11/1977 | |
| EP | 1183934 A1 | * | 3/2002 | A01D 34/6806 |
| EP | 1731016 A2 | * | 12/2006 | A01D 34/81 |
| EP | 2774470 A1 | * | 9/2014 | A01D 34/67 |
| EP | 3045030 A1 | * | 7/2016 | A01D 34/68 |
| EP | 3437454 B1 | | 1/2020 | |
| EP | 3453243 B1 | * | 7/2020 | A01D 34/6806 |
| EP | 3766328 A1 | * | 1/2021 | A01D 34/00 |
| GB | 2481106 A | * | 12/2011 | A01D 34/00 |
| WO | WO9605719 A2 | | 2/1996 | |
| WO | WO2010025619 A1 | | 3/2010 | |
| WO | WO-2018237251 A1 | * | 12/2018 | A01D 34/67 |
| WO | WO2019184983 A1 | | 10/2019 | |
| WO | WO-2023071798 A1 | * | 5/2023 | A01D 34/68 |

\* cited by examiner

ELECTRIC MOWER SWITCH SYSTEM

BACKGROUND

The present disclosure relates to an electric lawn mower. Electric lawn mowers include an electric motor operably connected to a cutting blade for drivingly rotating the cutting blade. The electric motor is supported on a wheeled deck along with a battery for powered operation of the electric motor. An operator handle is supported by the mower deck to extend from the deck for engagement by an operator for controlling the movement of the mower along a ground surface. The operator handle is typically moveable (pivotable) between an upright and locked first handle position and a second condition. The first handle position is appropriate for safe operation of the mower during cutting operation, for example. The second handle position may be a collapsed condition for the handle facilitating storage or transportation of the mower. It is desirable that the operation of the electric motor to rotate the cutting blade is disabled when the handle is moved from the upright and locked first handle position appropriate for cutting operation by the mower.

What is needed is a failsafe switch assembly for disabling the electric motor of an electric mower when the handle is pivoted from the upright and locked handle position appropriate for a cutting operation by the mower. More particularly, what is needed is a switch assembly for disabling the electric motor that promotes reliable failsafe protection while promoting longevity of the switch assembly.

BRIEF DESCRIPTION

According to one aspect, an electric lawn mower includes a mower deck supported by a plurality of wheels, an electric motor and battery supported on the motor deck, the battery supplying power to the electric motor, a handle extending from the deck and pivotable between first and second handle positions, and a folding switch assembly. The switch assembly respectively enables and disables the powered operation of the electric motor when the handle is located in the first and second handle positions.

According to embodiments, the switch assembly can include a magnet and a magnet sensor sensing the magnet. The magnet and the magnet sensor can be respectively supported by a turning member and a fixed member arranged such that the magnet overlies the magnet sensor when the handle is in the first handle position. The magnet sensor can be configured to generate high and low signals when the handle is respectively located in the first and second handle positions. The magnet sensor signals can be transmitted to a motor control unit for enabling and disabling the powered operation of the electric motor.

According to another aspect, a. pivoting failsafe switch assembly is provided for an electric lawn mower having an electric motor mounted on a mower deck. The pivoting switch assembly includes a handle supported by the mower deck and movable between a first handle position and a second handle position, a magnet, and a magnet sensor sensing the magnet. The magnet sensor generates a high signal when the magnet is proximate the magnet sensor and a low signal when the magnet is not proximate the magnet sensor. The pivoting switch assembly is arranged such that the magnet sensor generates the high signal when the handle is in the first handle position and the low signal when the handle is in the second handle position. The switch assembly further includes a motor control unit controlling the operation of the electric motor in response to the signals generated by the magnet sensor. The motor control unit respectively enables and disables the operation of the electric motor in response to the high and low signals

DETAILED DESCRIPTION

Figure 1:
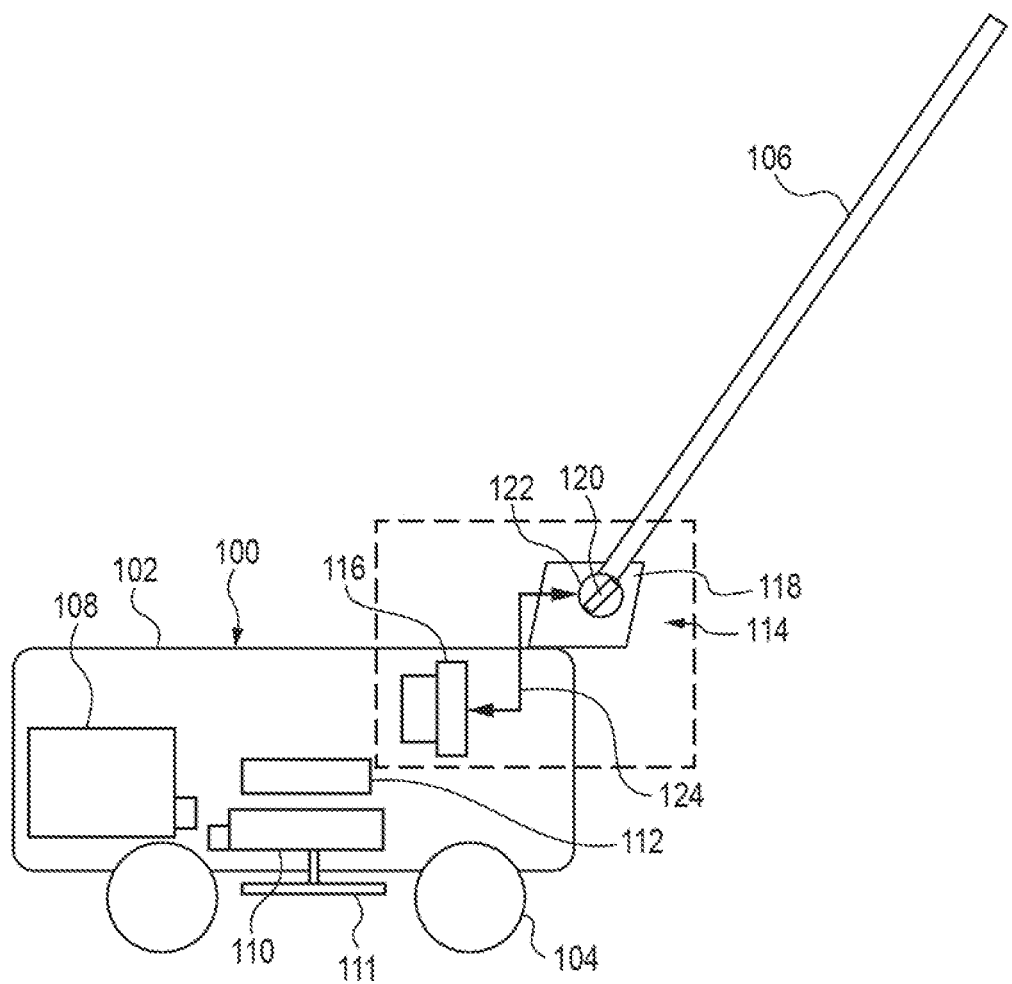
FIG. 1 is a side view of an electric lawn mower including a folding switch system according to one embodiment, the mower including a handle shown in a first upright position of the handle.

It should be understood that the description and drawings herein are merely illustrative and that various modifications and changes can be made without departing from the present disclosure. Referring now to the drawings, wherein like numerals refer to like parts throughout the several views, FIG. 1 is a view illustrating an electric mower 100 according to one embodiment, the elements of the mower being shown in a schematized manner. The electric mower 100 includes a mower deck 102 supported on a plurality of wheels 104. The electric mower 100 includes an electric motor 110 and a battery 108 providing a power source for the electric motor 110. Both the battery 108 and the electric motor 110 are supported on the mower deck 102. As shown, the mower 100 may also include a fan 112 located adjacent the electric motor to provide a cooling feature for the motor.

A motor control unit 116 is also supported on the mower deck 102. In known manner, the motor control unit 116 is configured to provide control of the interrelated operation of the electric motor 110, the battery 108 and the fan 112. The mower 100 also includes a cutting blade 111 operably connected to the electric motor 110 to be rotated by the powered operation of the electric motor 110 for cutting grass for example.

The electric mower 100 includes an operator handle 106 supported on the mower deck 102 by a handle mounting structure 118. As shown in FIG. 1, the handle mounting structure 118 provides a first handle position in which the handle 106 is supported to extend from the mower deck 102 in a generally upright, condition suitable for applying an operating force to the handle, for moving the wheeled mower deck 102 along a ground surface for example. The handle mounting structure 118 is also configured to provide for pivoting of the handle 106 with respect to the mower deck 104 from the first handle position of FIG. 1 to a second handle position (see the pivoting of the handle 106 illustrated in FIG. 4).

The handle mounting structure 118 includes a lock feature illustrated schematically at 132 for securing the handle in the generally upright first handle position of FIG. 1. The handle mounting structure 118 also includes a release feature illustrated schematically at 134 freeing the handle for pivot to allow for pivoting of the handle with respect to the mower deck 102 to a second, collapsed, position. As should be understood, mounting structures providing for such pivot of a mower handle with respect to a mower deck between generally upright and locked condition and a collapsed condition are well known and no further description is included.

Figure 2:
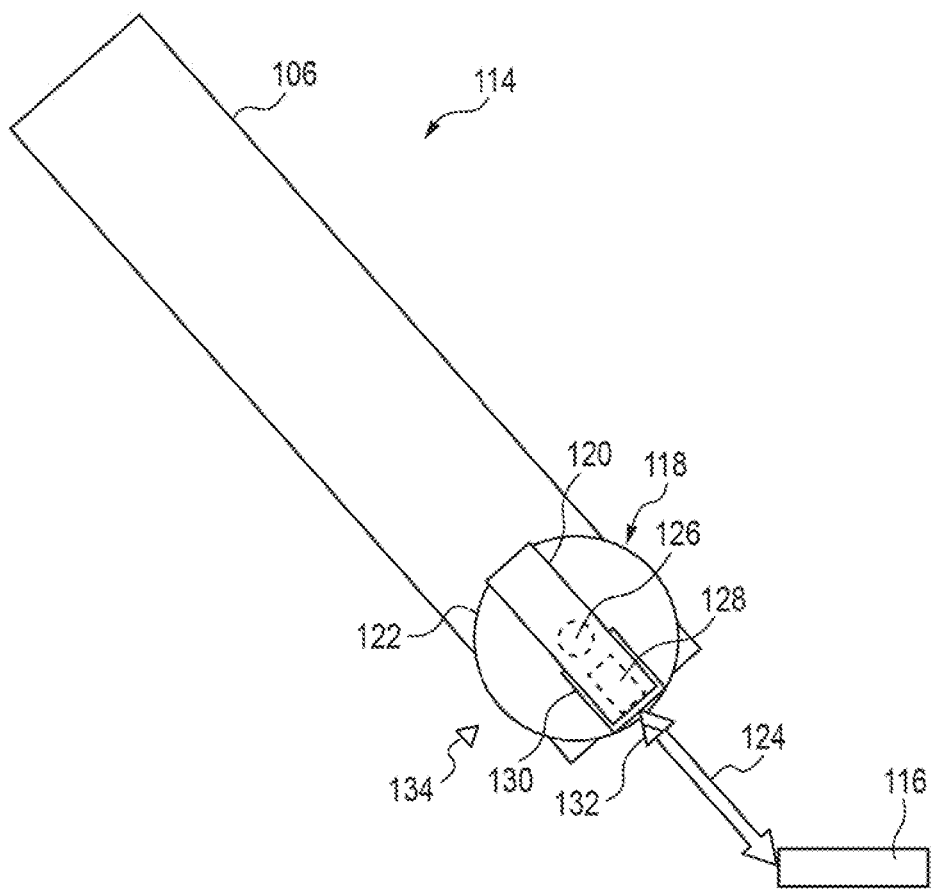
FIG. 2 is a view showing the folding switch system of FIG. 1, the folding switch system shown in a switch-closed condition associated with the first handle position of FIG. 1.

Referring to FIGS. 1 and 2, the electric mower 100 includes a folding (or "pivoting") switch system 114 providing a fail-safe control feature for the operation of the mower. The folding switch system 114 is configured to enable or prevent the motor 110 from operating to rotate the associated cutting blade 111 depending on the condition of the folding switch 114 (i.e., whether the switch is in a closed-switch condition or an open-switch condition). The folding switch system 114 includes a magnet 128 and a magnet sensor 130. The magnet sensor 130 is configured to sense a proximate positioning of the magnet 128 with respect to the magnet sensor 130. More particularly, the magnet sensor 130 is configured to output a "high" signal when the magnet 128 is positioned in an adjacent overlying relation to the magnet sensor 130 and to output a "low" signal if the magnet 128 is not located in the adjacent overlying relation. One embodiment of the magnet sensor 130 may include a Hall sensor.

Figure 3:
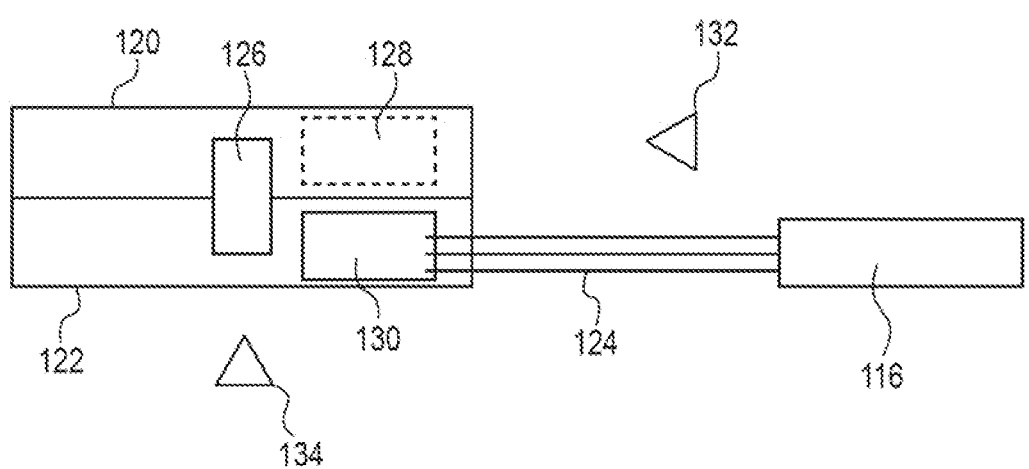
FIG. 3 is a view of the folding switch system of FIGS. 1 and 2, shown from a side of the folding switch system without the handle, the folding switch shown in the switch-closed condition of FIG. 2.
Figure 4:
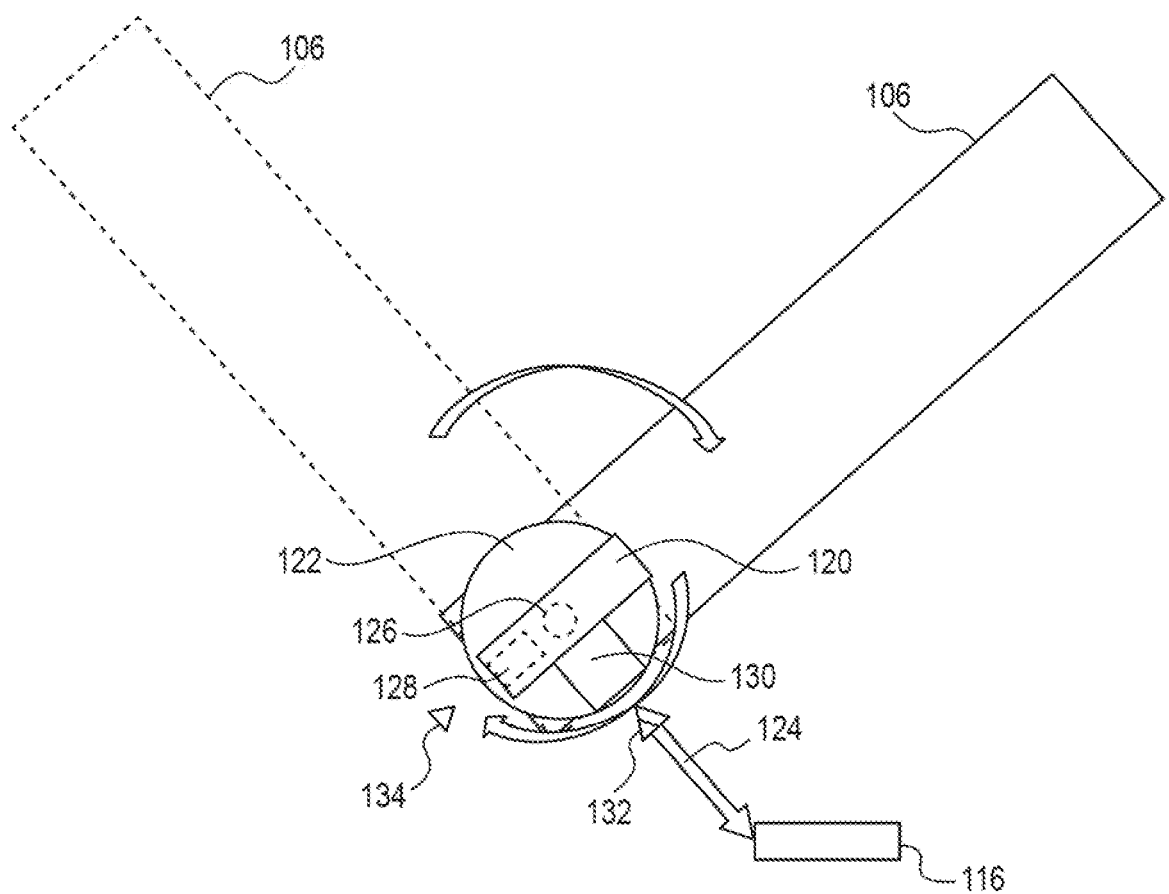
FIG. 4 is a view of the folding switch system of FIGS. 1 to 3 from a similar point of view as FIG. 2, the folding switch shown in a switch-open condition associated with a second handle position in which the handle is pivoted to a collapsed condition.

Referring to FIGS. 2 through 4, the folding switch system 114 includes housing members for the magnetic components. The housing members include a turning housing portion 120 carrying the magnet 128 and a fixed housing portion 122 carrying the magnet sensor 130. The housing portions 120, 122 are interconnected by a pin member 126 allowing relative rotation between the housing portions. Although shown schematically, it can be understood by comparing FIGS. 2 and 4 that the turning housing portion 120 is operably interconnected with the handle to pivot with the handle 106 with respect to the mower deck 102 when the handle is pivoted between the first and second handle positions. As also seen by comparing FIGS. 2 and 4, the fixed housing portion 122 remains fixed and does not move (rotate) when the handle 106 is pivoted between the first and second handle positions.

Referring to FIGS. 2 and 3, the folding switch system 114 is shown in a closed-switch condition associated with the upright and locked first handle position of handle 106 (i.e., the handle position in which the mower would be ready for a grass cutting operation). As shown, the magnet 128 in the closed-switch condition is located in an adjacent overlying position with respect to the magnet sensor 130 with the handle 106 in the first position. As discussed above, the magnet sensor 130 under these conditions is configured to output a "high" signal to indicate that the handle is located in the upright and locked condition appropriate for powered operation of the electric motor (i.e., to rotate the associated mower blade 111). As shown in FIG. 3, the folding switch system 114 includes wiring 124 interconnecting the magnet sensor 130 with the motor control unit 116. The wiring 124 provides for signals generated by the magnet sensor 130 to be transmitted to the motor control unit 116.

Figure 5:
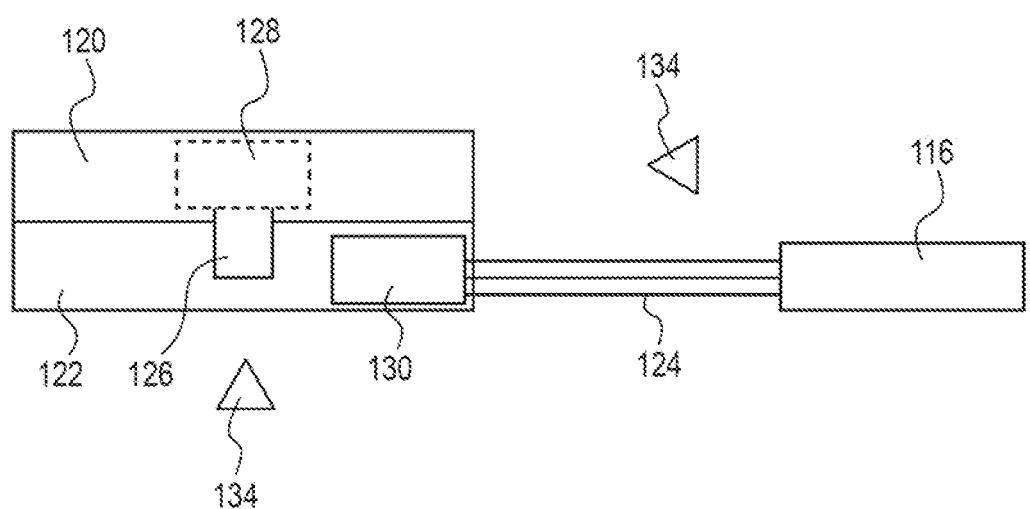
FIG. 5 is a view of the folding switch system of FIGS. 1 to 4 from a similar point of view of FIG. 3 without the handle, the folding switch shown in the switch-open condition of FIG. 4.

Referring to FIGS. 4 and 5, the folding switch system 114 is shown in an open-switch condition associated with the handle 106 having been pivoted to the second handle position (i.e., a collapsed condition for the handle). As shown, the magnet 128 is relocated in the open-switch condition when the turning housing portion 120 pivots with the handle 106 movement to the second handle position. The relocation of the magnet 128 in the open-switch condition associated with the handle rotation results in the magnet 128 no longer being positioned in adjacent overlying relation to the magnet sensor 130. The magnet sensor 130 is configured to respond to the relatively remote positioning of the magnet 128 of FIGS. 4 and 5 to output a "low" signal instead of the "high" signal associated with overlying condition of FIGS. 2 and 3. Similar to the "high" signal, the "low" signal associated with the open-switch condition is also transmitted to the motor control unit 116 via the wiring 124 to indicate that the handle 106 is no longer in the upright and locked condition appropriate for enabling powered operation of the electric motor (i.e., for safer rotation of the cutting blade 111).

The motor control unit 116 is programmed, or otherwise configured, to be responsive to either the "high" or the "low" signal from the magnet sensor 130 and to adjustably control the operation of the electric motor 110 accordingly. More particularly, when the folding switch system 114 is placed in the closed-switch condition (i.e., when the handle is upright and locked in the first handle position), the motor control unit 116 is configured to respond to the receipt of the "high" signal from the magnet sensor 130 to permit (enable) the powered operation of the electric motor 110 (for rotation of the cutting blade 111). Such powered operation of the electric motor 110 could follow, for example, from the actuation of a starter button or other user control feature (not shown) by an operator. The closed-switch condition of the folding switch system 114 may also be referred to as the "motor-enabled" condition or the "mowing permitted" condition.

When the folding switch system 114 is placed in the open-switch condition (i.e., when the handle 106 is moved to a second, collapsed, position), the motor control unit 116 is configured to respond to the receipt of the "low" signal from the magnet sensor 130 to prevent (disable) the powered operation of the electric motor 110 (to prevent blade rotation).

The embodied folding switch system 114 provides a reliable failsafe feature for enabling/disabling the powered operation of the electric motor 110 of the electric mower 100 depending on the position of the operator handle 106. The inclusion of the magnet and magnet sensor and the requirement for the high signal for control unit to enable the powered motor operation by the control unit promotes a reliable failsafe feature. The use of the magnet and magnet sensor, which involves components that function through proximity without requiring physical engagement, promotes longevity for the switch assembly.

The magnet 128 and the magnet sensor 130 of the depicted embodiment are both generally rectangular in shape. Also, as shown, the magnet sensor 130 has outer dimensions that are larger than the outer dimensions of the magnet 128. However, the general shapes of the magnet 128 and the magnet sensor 130 could vary from the generally rectangular shape that is depicted. The relative sizes of the magnet 128 and magnet sensor 130 could also vary from that shown.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electric lawn mower comprising:
a mower deck supported by a plurality of wheels;
an electric blade motor supported on the mower deck to drive a cutting blade of the mower;
a battery supported on the mower deck for supplying power to the electric motor;
a handle extending rearwardly from the mower deck for receipt of force applied by an operator located behind the mower deck to propel the lawn mower, the handle pivotable between a first raised and locked handle position for mower operation and a second lowered handle position for mower storage;
a folding switch assembly respectively enabling and disabling the powered operation of the electric blade motor when the handle is located in the first and second handle positions, the folding switch including a magnet and a magnet sensor configured to sense the magnet.

2. The electric lawn mower of claim 1, further comprising a fan located adjacent the electric motor.

3. The electric lawn mower of claim 1, wherein the magnet sensor generates a high signal when the magnet and magnet sensor are adjacent to each other, the magnet sensor generating a low signal when the magnet and magnet sensor are not adjacent to each other.

4. The electric lawn mower of claim 1, wherein the magnet is supported by a turning member that moves when the handle is moved between the first and second handle positions.

5. The electric lawn mower of claim 4, wherein the magnet sensor is supported by a fixed member such that the position of the magnet sensor remains fixed when the sensor moves with the turning member.

6. The electric lawn mower of claim 3, wherein the sensor overlies the magnet sensor when the handle is located in the first handle position.

7. The electric lawn mower of claim 6, wherein the sensor and the magnet sensor are generally rectangular.

8. The electric lawn mower of claim 6, wherein the magnet sensor is sized to have outer dimensions that are greater than outer dimensions of the magnet.

9. The electric lawn mower of claim 3, further comprising a motor control unit supported by the mower deck, the motor control unit controlling the powered operation of the electric motor, the motor control unit respectively enabling and disabling the powered operation of the electric motor in response to the high and low signals generated by the magnet sensor.

10. The electric lawn mower of claim 9, wherein the folding switch assembly further includes wiring interconnecting the magnet sensor and the motor control unit.

11. The electric lawn mower of claim 5, wherein each of the turning member and the fixed members is a housing member respectively supporting the magnet and the magnet sensor in an interior of the housing member.

12. The electric lawn mower of claim 4, wherein the turning member and the fixed member are interconnected by a pin member.

13. The electric lawn mower of claim 1 further comprising lock and release features for respectively locking the handle in the first position and releasing the handle to provide for movement between the first and second handle positions.

14. An electric lawn mower comprising:
a mower deck;
an electric blade motor supported by the motor deck;
a cutting blade connected to the electric blade motor for rotation of the cutting blade when the electric blade motor is operated;
a motor control unit controlling the operation of the electric blade motor;
a handle extending rearwardly from the mower deck for receiving force applied by an operator walking behind the mower to propel the mower, the handle moveable between a first raised and locked handle position for mower operation and a second lowered handle position for mower storage; and
a pivoting switch assembly including a magnet and a magnet sensor sensing the magnet, the magnet sensor motor-enable signal when the handle is in the first handle position and a motor-disable signal when the handle is in the second handle position, the magnet sensor signals transmitted to the motor control unit for respectively enabling and disabling the operation of the electric blade motor.

15. The electric lawn mower of claim 14, wherein the pivoting switch assembly includes a turning member and a fixed member respectively supporting the magnet and the magnet sensor, the turning member moving when the handle is moved between the first and second handle positions.

16. The electric lawn mower of claim 15, wherein the magnet overlies the magnet sensor when the handle is in the first handle position.

17. A pivoting failsafe switch assembly for an electric lawn mower having an electric blade motor mounted on a mower deck, the switch assembly comprising:
a handle supported by the mower deck to extend rearwardly from the mower deck for receipt of force applied by an operator walking behind the mower deck to propel the mower, the handle movable between a first raised and locked handle position for mower operation and a second lowered handle position for mower storage;
a magnet;
a magnet sensor sensing the magnet, the magnet sensor generating a high signal when the magnet is proximate the magnet sensor, the magnet sensor generating a low signal when the magnet is not proximate the magnet sensor, the pivoting switch assembly arranged such that the magnet sensor generates the high signal when the handle is in the first handle position and generates the low signal when the handle is in the second handle position; and
a motor control unit controlling the operation of the electric motor in response to the signals generated by the magnet sensor, the motor control unit respectively enabling and disabling the operation of the electric blade motor in response to the high and low signals.

* * * * *